United States Patent Office 3,132,983
Patented May 12, 1964

3,132,983
BONDING OF THERMOPLASTIC MATERIALS
Alan Paul Osborne and Robert Melson Broughton, Erdington, Birmingham, England, assignors to Dunlop Rubber Company Limited, London, England, a British company
No Drawing. Filed Oct. 24, 1960, Ser. No. 64,244
Claims priority, application Great Britain Oct. 30, 1959
7 Claims. (Cl. 156—308)

This invention relates to the treatment of thermoplastic materials to render them more amenable to bonding, and more particularly to the bonding of thermoplastic materials of high melting point, especially isotactic polypropylene, to rubber and other vulcanisable elastomeric materials.

The valuable properties of isotactic polypropylene are well known; thus, while in general it possesses the essential properties normally possessed by the high density form of polyethylene, it is further characterised by higher tensile and flexural strength and particularly by a better resistance to heat (its melting point is about 15°–20° C. higher) and to environmental stress-cracking. Thus, it can be used in many situations in which it is subjected to a temperature above the heat distortion point of even the high density form of polyethylene.

For many purposes a composite material made by laminating isotactic polypropylene with natural rubber and other elastomers would be very useful. Unfortunately, however, it has been found very difficult if not impossible to produce a satisfactory bond between the isotactic polypropylene and the elastomer.

The present invention provides a process whereby not only isotactic polypropylene, but also other thermoplastic materials of high melting point, can be bonded to vulcanisable compositions comprising elastomeric materials which are compatible therewith. The expression "high melting point" denotes a melting point above the lowest temperature at which the elastomer composition can be vulcanised; an elastomeric material is regarded as being compatible with the thermoplastic material when they do not differ, for example in polarity, crystallite structure or spatial configuration, to such an extent that ti is not possible to produce a reasonably strong direct bond between them.

The invention, in its broadest aspect, comprises the step of rendering the surface of a thermoplastic material more amenable to bonding by subjecting it to the action of a solvent for the material at a temperature (below the melting point of the material) and for a time such that, when freed from the solvent, the surface has a matt white appearance.

Preferably the solvent employed is one which will dissolve the thermoplastic material at elevated temperatures only, and the material is contacted with the solvent at such temperature, after which the material, while still wet with the solvent, is cooled to a temperature at which the solvent will no longer dissolve it.

In the most important application of the invention, a thermoplastic material of high melting point is bonded to a vulcanisable composition comprising an elastomeric material compatible therewith by applying the so treated surface of the thermoplastic material to the surface of the elastomer composition, and subjecting the assembly to pressure at a temperature at which the elastomer becomes vulcanised but which is below the melting point of the thermoplastic material.

The invention is particularly useful in connection with crystallisable thermoplastic materials, i.e. materials which are capable of existing in a form giving a regular X-ray diffraction pattern. Usually the material will be in such a crystalline form when treated with the solvent. Examples of thermoplastic materials to which the invention can usefully be applied include, besides isotactic polypropylene, polyethylene of the high density type (i.e. polyethylene of the general type obtainable by polymerising ethylene at low or moderate pressures in the presence of a catalyst such, for example, as the reaction product of titanium tetrachloride and an aluminum trialkyl), isotactic polybutylenes, resinous copolymers of ethylene and propylene, chlorinated poly-olefines, vinyl chloride polymers, polycarbonates, and polyethers containing the recurring group

—[O.CH$_2$.C(CH$_2$X)$_2$.CH$_2$.O—]

(where X is a halogen atom and especially chlorine) obtained from halogenated pentaerythritol and hereinafter referred to as halogenated pentaerythritol polymers. Examples of elastomers which can be bonded are natural rubber, modified natural rubber such as graft polymers of rubbers, synthetic rubbers, comprising polymers of butadiene or isoprene. Butyl rubber, copolymers of butadiene with, for example, styrene or methyl methacrylate or with isopropenyl ketone provided the ketone content does not exceed 30 mole percent, and elastomeric copolymers of ethylene and propylene. Such elastomers are well known in the art.

The temperature at which the treatment is effected will vary with the thermoplastic material and the solvent employed. Since the treatment is intended to affect only the surface of the material will usually be subjected to the action of the solvent for a short period only, preferably between 1 and 30 seconds, and especially between 4 and 30 seconds. It has been found that if on removal of the solvent the surface of the thermoplastic material acquires a matt white appearance, this may be taken as evidence that the temperature and time are adequate, and that the surface is in a condition in which it is much more amenable to bonding than in its ordinary state, and in particular will bond readily with a compatible elastomer composition when bonding and vulcanisation of the elastomer are carried out simultaneously. In an initially transparent material the development of the white matt appearance is accompanied by an increase in opacity, the article becoming more or less translucent if not completely opaque.

The solvent employed will, in practice, vary to some extend with the thermoplastic material. With isotactic polypropylene and ethylene/propylene copolymers it is preferred to use a hydrocarbon or hydrocarbon mixture which is liquid both at ordinary temperatures and under the treatment conditions. Examples of suitable solvents are xylene, white spirit, heavy coal-tar naphtha, kerosene, pinen and turpentine. These same solvents, with the addition of toluene, can advantageously be used with the high density form of polyethylene. With polycarbonates and chlorinated pentaerythritol polymers aliphatic ketones of suitably high boiling point, especially cyclic ketones, for example cyclohexanone, can be used with advantage.

With polymers containing a high proportion of chlorine, e.g. polyvinyl chloride and blends thereof with chlorinated polyethylene, chlorinated hydrocarbons, especially chlorinated aromatic hydrocarbons, in particular chlorobenzene, are effective.

After the treatment adherent solvent can be removed from the treated surface, e.g. by washing or evaporation, after which the surface can, if desired, be air dried. Preferably through all such operations the temperature of the surface is kept below about 50° C. Complete removal of the solvent is not essential. The effect produced by the solvent is fairly permanent at ordinary temperatures; for example, a treated polypropylene sheet will still bond strongly to natural rubber after storage for 90 days, provided it is kept clean.

The bonding of the treated thermoplastic material to an elastomer composition may be effected by placing the two materials in contact and subjecting the assembly to heat and pressure so as simultaneously to vulcanise the elastomer and to bond it to the thermoplastic material. For this purpose, normal vulcanising temperatures appropriate to the elastomeric composition can be used, so long as they are below the softening point of the thermoplastic material. Thus, with isotactic polypropylene, temperatures up to about 160° C. can be used. Different vulcanising agents, as appropriate for the elastomer, may be used, including for example sulphur and also peroxide vulcanising agents; conventional additives, such for example as accelerators, fillers and anti-oxidants, may also be present in the elastomer composition or the thermoplastic material or both.

The bonded products obtainable from isotactic polypropylene in accordance with the invention may, for example, be in the form of conveyor belting, tyres, hose, or flexible containers for chemicals, in which the chemical inertness of the polypropylene is of value. The fact that the isotactic polypropylene is resistant to heat distortion at temperatures up to 160° C. ensures that vulcanisation temperatures up to this value can be employed without causing an undesirable change in the form or dimentions of the polypropylene component of the laminate or like structure.

During the vulcanisation and bonding process the effect of the solvent treatment on the thermoplastic material is reversed, and those parts of its surface which are not bonded to the elastomer revert to a non-polar hydrophobic state. Thus, its surface properties, e.g. the valuable surface properties of isotactic polypropylene, are not lost or diminished as a result of the treatment and bonding.

It will be understood that references to "isotactic polypropylene" (that is, polypropylene in which the methyl side chains are all on the same side of the molecular plane) are not intended to denote only products which are 100% isotactic. Indeed such products are not easily made, and the commercial material has a degree of "isotacticity" substantially less than 100%, though normally above 80 percent.

While bonding to elastomers during vulcanisation represents the most important application of the invention, the surface-treated isotactic polypropylenes or other thermoplastic materials may also be bonded to substrates of many different kinds using adhesives known in the art, including thermosetting and like adhesives. They may also be bonded through an elastomer layer to a metal surface which is capable of bonding with the elastomer, e.g. to a surface of steel provided with a suitable adhesive or priming coat, or of brass-plated steel, as in the formation of tank linings and the like. The bonding of the thermoplastic material to the elastomer and of the elastomer to the metal surface may be effected separately or simultaneously.

This invention is illustrated by the following examples; all "parts" are by weight.

*Example I*

A sheet of isotactic polypropylene 0.040 inch thick was immersed in xylene at 130° C. for 15 seconds. The sheet was then removed from the xylene, drained, and exposed to the air for 2 hours, by which time all the adherent xylene had evaporated. The surfaces of the sheet had now a matt, opaque, white appearance.

The treated sheet was placed in a slab mould with a natural rubber compound of the following composition:

|   | Parts |
|---|---|
| Rubber | 100.0 |
| Fast extrusion furnace black | 36.00 |
| Zinc oxide | 4.50 |
| Stearic acid | 0.75 |
| Sulphur | 2.80 |
| N-cyclohexyl-2-benzthiazole-sulphenamide | 0.70 |
| Mineral oil | 10.75 |
| N-nitrosodiphenylamine | 0.30 |
| Polymerised trimethyl-dihydroquinoline ("Flectol [1] H") | 1.50 |

[1] "Flectol" is a registered trademark.

The assembly was vulcanised under hydraulic pressure for 45 minutes at 141° C. The bond obtained was so strong that attempts to break it resulted only in tearing of the rubber.

*Example II*

A similar sheet of the same isotactic polypropylene was immersed in white spirit for 15 seconds at 130° C., drained, exposed to the air for 2 hours to allow the solvent to evaporate, and bonded to a white pigmented rubber composition during vulcanisation, as described in Example I.

*Example III*

Example I was repeated except that there was used as the rubber compound the following composition:

|   | Parts |
|---|---|
| Natural rubber | 100.00 |
| Fast extrusion furnace black | 50.00 |
| Dicumyl peroxide | 2.00 |

Vulcanisation was effected at 145° C. for 30 minutes.

The product in each of these examples comprised the vulcanised rubber securely bonded to the isotactic polypropylene. In each case the bond was so strong that the rubber tore before the bond could be broken. Moreover, on prolonged flexing the rubber part of the test pieces ruptured, while the bond and the polypropylene layer remained intact.

Similar results were obtained using sheets of isotactic polypropylene of various grades, and also using pigmented isotactic polypropylenes.

*Example IV*

Mild sheet steel prepared by degreasing and linishing was coated with the proprietary solution adhesive "Chemlok 220" and the solvent allowed to evaporate completely. A piece of calendered sheet rubber 0.010 inch thick and consisting of a black-loaded sulphur-vulcanising compound as used in Example I was placed over the primed metal and itself covered with a sheet of solvent-treated isotactic polypropylene approximately 0.010 inch thick. The whole assembly was then heated for 30 minutes at 153° C. under positive pressure to effect vulcanisation of the elastomer. Attempts to remove the organic layer from the metal caused failure to occur within the rubber layer. Similar results were obtained using "Typly UP" and "Typly RC" as well as other metal primers based on chlorinated rubber, oxidised rubber, or cyclised rubber.

Where an elastomer can be bonded directly to the metal without the interposition of a separate adhesive layer, e.g. where the steel is brass-plated, the polypropylene may be bonded to the metal using a rubber compound as the interply without special priming of the metal surface.

Example V

A piece of degreased pickled and linished mild steel was coated with a piece of calendered sheet of natural rubber of the following composition:

| | Parts |
|---|---|
| Natural rubber | 100.0 |
| Zinc oxide | 5.0 |
| Stearic acid | 1.0 |
| Sulphur | 6.0 |
| Mecaptobenzthiazole | 1.0 |
| "Flectol H" | 2.0 |
| Easy processing furnace carbon black | 55.0 |
| Cobalt linoleate | 6.0 |

This assembly was bonded to a sheet of solvent-treated polypropylene during the vulcanisation of the rubber by heating the whole for 45 minutes at 153° C. under positive pressure. Attempts to remove the organic layer from the metal after cooling caused either considerable stretching of the polypropylene layer or failure in the rubber compound.

Example VI

A sheet of polycarbonate resin was immersed in cyclohexanone at 120° C. for 20 seconds. It was then washed in water containing a detergent in order to remove the solvent and then in clean water and completely dried.

The treated sheet was placed in a slab mould and covered with a heat-resisting butadiene-acrylonitrile polymer rubber compound of the following composition:

| | Parts |
|---|---|
| Butadiene-acrylonitrile polymer | 100 |
| Aluminium oxide | 100 |
| Dicumyl peroxide | 2 |

The assembly was heated under hydraulic pressure for 90 minutes at 155° C.; after cooling, the vulcanised elastomer was firmly bonded to the polycarbonate resin.

Example VII

A sheet of "Penton" (a polyether having the recurring unit—[O.CH$_2$.C(CH$_2$Cl)$_2$.CH$_2$.O—]) was treated by immersion in cyclohexanone for 30 seconds at 95° C., washed in petroleum naphtha and allowed to dry in the sun. The treated sheet was then placed in a slab mould and covered with a sheet of a butadiene-acrylonitrile polymer of the following composition:

| | Parts |
|---|---|
| Butadiene-acrylonitrile copolymer | 100 |
| Fast extrusion furnace carbon black | 40 |
| Zinc oxide | 5 |
| Stearic acid | 1 |
| Tetramethylthiuram monosulphide | 3 |
| Dibenzthiazyl disulphide | 3 |
| Tritolyl phosphate | 10 |

On heating for 30 minutes at 155° C. under hydraulic pressure the rubber composition was vulcanised and firmly bonded to the sheet of chlorinated polyether.

Example VIII

A sheet of "Hostalit Z" (a blend of polyvinyl chloride and chlorinated polyethylene) was immersed for 30 seconds in chloro-benzene at 100° C., excess solvent was removed by drying, and the treated sheet placed in a slab mould and covered with a synthetic elastomer compound of the following composition:

| | Parts |
|---|---|
| Neoprene (type GN–H) | 100 |
| Fast extrusion furnace carbon black | 50 |
| Zinc oxide | 5 |
| Magnesium oxide | 4 |
| Phenyl-alphanaphthylamine | 2 |

By heating for 30 minutes at 155° C. under hydraulic pressure the rubber compound was vulcanised and firmly bonded to the resin sheet.

Example IX

A sheet of a high density polyethylene was immersed in toluene for 10 seconds at 90° C. and then dried in a current of warm air. The treated sheet was placed in a slab mould and covered with a natural rubber compound of the following composition:

| | Parts |
|---|---|
| Natural rubber | 100 |
| Fast extrusion furnace carbon black | 35 |
| Zinc oxide | 5 |
| Stearic acid | 2 |
| Sulphur | 2 |
| Piperidine-pentamethylene-dithiocarbamate | 0.5 |

After heating for 30 minutes at 100° C. under hydraulic pressure the vulcanised rubber compound was found to be firmly bonded to the polyethylene.

Example X

A sheet of isotactic polypropylene 0.040 inch thick was immersed in xylene at 130° C. for 15 seconds and then air dried as described in Example I. The treated sheet was then placed in a slab mould and covered with a sheet of resin-rubber shoe sole material of the following composition:

| | Parts |
|---|---|
| Styrene 85%/butadiene 25% copolymer resin | 40 |
| Natural rubber | 75 |
| Butadiene 75%/styrene 25% copolymer rubber | 25 |
| Calcium silicate | 100 |
| Zinc oxide | 5 |
| Stearic acid | 1 |
| Coumarone resin | 2.5 |
| Paraffin wax | 0.5 |
| Sulphur | 3.0 |
| Colouring pigments (various) | 5.0 |
| Benzthiazyl disulphide | 2.0 |
| Tetramethyl-thiuram disulphide | 0.15 |
| Non-staining phenolic antioxidant | 1.0 |

The assembly was then heated under pressure for 20 minutes at 153° C. to vulcanise the shoe sole material and bond the polypropylene sheet thereto. The bond obtained was so good that no separation could be obtained at the interface even at 100° C., failure occuring only in the rubber layer.

Example XI

A piece of polypropylene sheet treated as described in the previous example was placed in a slab mould and covered with a sheet of a Butyl rubber composition of similar thickness. The composition of the Butyl rubber layer was as follows:

| | Parts |
|---|---|
| Butyl rubber | 90 |
| Chlorosulphonated polyethylene | 10 |
| Whiting | 133 |
| Refined china clay | 166 |
| Mineral oil | 15 |
| Magnesium oxide | 5 |
| Zinc oxide | 5 |
| Sulphur | 1.5 |
| Mercaptobenzthiazole | 1.5 |
| Di-N-pentamethylenethiuram tetrasulphide | 1.5 |

The assembly was heated under pressure for 30 minutes at 147° C. to vulcanise the Butyl rubber layer and to bond it to the treated polypropylene. A strong bond was obtained which could not be separated at the interface.

Example XII

A piece of polypropylene sheet, solvent treated as in Example I, was bonded as previously described to a sheet of natural rubber flooring material of the following composition:

| | Parts |
|---|---|
| Rubber | 21.2 |
| Whiting | 40.0 |
| Wood flour | 6.2 |
| China clay | 25.0 |
| Titanium dioxide | 5.0 |
| Ultramarine | 1.0 |
| Sulphur | 0.75 |
| Mercaptobenzthiazole | 0.10 |
| N-cyclohexylbenzthiazole-sulphenamide | 0.40 |

After vulcanising the rubber in pressure contact with the treated polypropylene the two layers were strongly bonded together.

We claim:
1. Process for bonding a thermoplastic material to a solid vulcanisable composition comprising an elastomer compatible therewith, which comprises applying a surface of the thermoplastic material, which has been subjected to the action, as the sole adhesion assistant, of a solvent therefor at a temperature below the melting point of the material for a time such that, when freed from solvent, the surface has a matt white appearance, to the surface of the elastomer composition while both surfaces are substantially free from the said solvent and subjecting the assembly to pressure at a temperature at which the elastomer becomes vulcanised but which is below the melting point of the thermoplastic material.
2. Process according to claim 1, wherein the thermoplastic material is treated with a liquid which is a solvent therefor only at elevated temperatures, the treatment being effected at such temperature, and is cooled, while still wet with the liquid, to a temperature at which the liquid will no longer dissolve it.
3. Process according to claim 1, wherein the thermoplastic material is crystallisable.
4. Process according to claim 2, wherein an isotactic polypropylene is subjected to the action of a normally liquid hydrocarbon at a temperature above 125° C.
5. Process according to claim 2, wherein a polyethylene of the high density type is subjected to the action of a normally liquid hydrocarbon at a temperature of at least 90° C.
6. Process according to claim 2, wherein a thermoplastic material selected from the group which consists of chlorinated pentaerythritol polymers and polycarbonates is subjected to the action of an aliphatic ketone at a temperature of at least 90° C.
7. Process according to claim 2, wherein a vinyl chloride polymer is subjected to the action of a chlorinated aromatic hydrocarbon at a temperature of at least 90° C.

References Cited in the file of this patent
UNITED STATES PATENTS

| 1,565,532 | Tupper | Dec. 15, 1925 |
| 2,314,975 | Ford | Mar. 30, 1943 |
| 2,349,290 | Loughborough | May 23, 1944 |
| 2,536,183 | Jamieson | Jan. 2, 1951 |
| 2,697,058 | Lasak | Dec. 14, 1954 |
| 2,711,985 | Olson | June 28, 1955 |
| 2,957,047 | Schulde et al. | Mar. 1, 1960 |

OTHER REFERENCES

Encyclopedia of Chemical Technology, Kirk-Othmer (vol. 10, pages 1, 2, 944, 945, and vol. 14, page 725). Copyright 1953 by The Interscience Encyclopedia, Inc.